June 2, 1970   J. G. TRUMP   3,515,909
DIELECTRIC-COVERED ELECTRODES
Filed Aug. 14, 1968   3 Sheets-Sheet 1

June 2, 1970 J. G. TRUMP 3,515,909
DIELECTRIC-COVERED ELECTRODES
Filed Aug. 14, 1968 3 Sheets-Sheet 3

United States Patent Office 3,515,909
Patented June 2, 1970

3,515,909
DIELECTRIC-COVERED ELECTRODES
John George Trump, 9 Cambridge St.,
Winchester, Mass. 01890
Continuation-in-part of application Ser. No. 601,945,
Dec. 15, 1966. This application Aug. 14, 1968, Ser.
No. 767,877
Int. Cl. H02n 1/00; H01b 9/04
U.S. Cl. 310—6
15 Claims

ABSTRACT OF THE DISCLOSURE

A multi-electrode gas-insulated system for generation and for transmission of D.C. or low frequency, high voltage electric power which has one electrode surrounded over substantially all of its surface by a solid dielectric having a resistivity lower than that of the insulating gas. The solid dielectric thickness, although small in comparison to the gas gap, damps the ability of the electrode to transfer electric charge from transient disturbances in the gas-insulating medium, reduces the electric field intensity on the electrode surface and increases the electrical strength of the system under normal and transient voltage conditions.

---

This invention relates to compressed-gas-insulated systems, such as belt-type electrostatic generators, and in particular to such a system wherein at least one of the electrodes between which the gas insulation is provided has its surface covered with a layer of solid dielectric and is a continuation in part of application Ser. No. 601,945, filed on Dec. 15, 1966. My invention comprehends a belt-type electrostatic generator or other high voltage compressed-gas-insulated system wherein the metallic electrode surface at high voltage is totally or substantially intimately covered with a predetermined thickness of solid dielectric characterized by high dielectric strength and high resistivity. The thickness of this solid dielectric, although substantial, is nevertheless small in comparison to the gaseous gap which is the principal insulating medium.

My invention is not limited to electrostatic generators, but includes any two or multi-electrode system insulated in compressed gases, such as compressed-gas-insulated transmission lines. For example, one such embodiment of my invention comprehends a reliable system for transmission of electric power at very high voltage, comprising at least one conductor at high voltage relative to ground, surrounded by a metallic gas-tight shell at substantially ground potential, the intervening space filled with a gaseous insulating medium at high pressure, said conductor at high voltage being supported at intervals by solid insulating supports and said conductor being surrounded over substantially all of its surface by a solid dielectric. My invention also comprehends covering with a solid dielectric not only the inner conductor but also the inner surface of the outer conductor or shell.

The embodiment of my invention in which both electrodes are coated or covered with a solid dielectric is particularly advantageous in A-C systems, such as A-C transmission lines, wherein each electrode becomes alternately positive and negative. The inner surface of the enclosing pipe is, of course, subjected to a lower gradient than the surface of the central conductor by the ratio of $1/r_2$, but is likely to have a poorer surface finish on it which could more than offset this geometrical advantage.

In accordance with the invention, the high-voltage terminal of an electrostatic generator is covered by a dielectric shell of suitable thickness. The inner surface of this dielectric shell is preferably rendered conducting and is preferably maintained in electrical contact with the high voltage terminal. In a similar way, the central conductor of a transmission line may be covered by a dielectric tube, and the use of such dielectric tubes surrounding the high voltage conductor contributes in a major way to the electrical strength of the line particularly under transient and impulse conditions. It should completely inactivate metal and other conducting particles which initiate instabilities in compressed gas insulation. While in principle thin dielectric film (a few mils thick) would accomplish this purpose, a thicker dielectric with considerable insulation capability of its own goes much further toward securing the desired effect. Representative dielectric coatings for the central conductor are glass, such as Corning 7740, or glazed electrical porcelain, or an epoxy or other plastic. The glass is preferred because of its high volume strength and inorganic nature with greater uniformity in controllable resistivity, though other dielectrics may offer greater flexibility in manufacture.

In the case of a transmission line, it is an important idea that these dielectric tubes be properly introduced into the stand-off insulators so that solid insulation is interposed at all points in the flux path from the central conductor to the shell. A method of accomplishing this by overlapping is illustrated hereinafter. This overlapping arrangement also makes feasible the use of a number of short cylindrical lengths of glass or plastic tubing instead of single continuous lengths between insulators.

Notwithstanding the above, while thick dielectric coatings may be better, thin film coatings may in some cases be sufficient to accomplish some of the purposes of this invention and have the merit of being easier to apply. In addition to organic and inorganic thin coatings, the anodizing of the aluminum surface to produce a tough, adherent, dielectric coating on inner conductor, and preferably on both inner conductor and inner surface of aluminum pipe should be an important practical way of accomplishing the dielectric surfacing.

A factor which diminishes the reliable insulating strength of a compressed-gas-insulated system is associated with the high conductivity of the metallic material used for both the grounded and the high voltage electrodes. It is well-known that any departure from absolute smoothness on the surfaces of electrodes between which a high potential is maintained results in a local intensification of the electric field at that region of roughness or projection. As the voltage on the system is increased, such intensifications of the field may reach the level at which local ionization of the gas takes place. The electrons produced by such ionization may themselves cause further ionization. All ionization events will evoke photons which travel with the speed of light and contribute photonionization of the gas as well as photo-emission of electrons from the negative electrode.

Electron avalanches feed exponentially into or out of such points of high field intensity depending on the polarity of the electrode. In each case, however, the avalanche leaves behind a positive-ion space charge spike which distorts the normal electric field.

All of these processes obviously contribute to the interelectrode current and power loss which increases, after the initial threshold, rapidly with voltage.

The major disadvantageous aspect of these currents is that they leave behind a positive space charge which alters the geometrically-determined distribution of the electric field. This space charge has the effect of intensifying the field near one electrode surface while reducing it at the other. This enhances the several processes of ionization, including especially the Townsend alpha process—ionization by electron collisions. In compressed gases, the higher density of gas molecules increases the photoelectric absorption of light emitted when excited and ionized atoms return to the normal state. The higher density also reduces the ability of positive ions to diffuse away from the region where they were created. All of these factors and others contribute to the development of electrical instability and insulation breakdown.

I have discovered that many of these complications can be reduced by altering the basic nature of the electrode surface in accordance with my invention.

The invention may best be understood from the following detailed description thereof, having reference to the accompanying drawing, in which.

Figure 1:
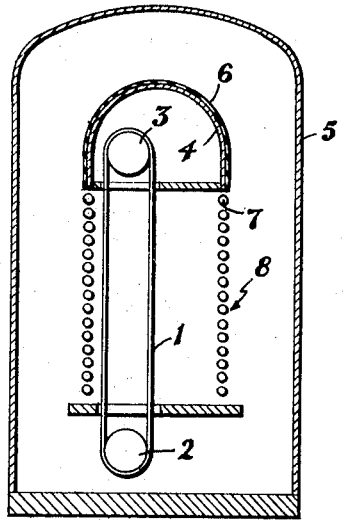
FIG. 1 is a diagrammatic view of an electrostatic belt-type generator embodying the present invention.

Referring to the drawing and first to FIG. 1 thereof, the operation of the electrostatic belt-type generator therein shown is in general well-known and need not be described herein in any detail. Suffice it to say that electric charge is carried by an insulating belt 1 supported between two pulleys 2, 3 from the grounded end of the apparatus to a hollow electrode 4 which constitutes a high voltage terminal. The high-voltage portions of the apparatus are enclosed within a grounded tank 5 containing an insulating gas under pressure. Details of operation of electrostatic belt-type generators may be found, for example, in U.S. Pat. No. 1,991,236 to Van de Graaff and No. 2,252,668 to Trump and a vol. XI, page 1 of "Reports on Progress in Physics" (1948).

In accordance with the invention, a dielectric shell 6 is mounted upon the hollow electrode or high voltage terminal, or the inner surface of the dielectric shell is itself rendered conducting and connected to the high voltage terminal.

Figure 1A:
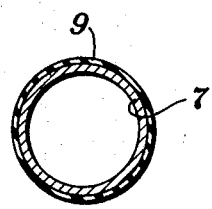
FIG. 1A is a detail of FIG. 1.
Figure 1B:
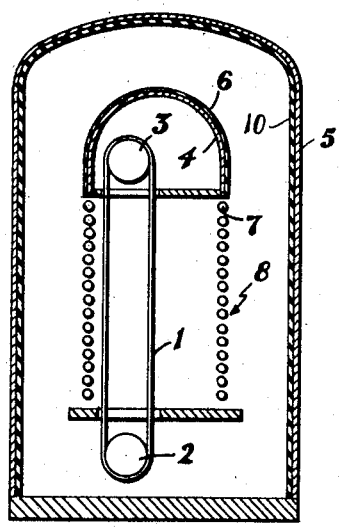
FIG. 1B is a view similar to that of FIG. 1 and showing a modification thereof.
Figure 1C:
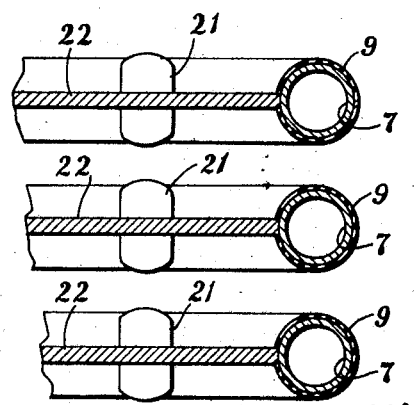
FIG. 1C is a detail similar to that of FIG. 1A and showing a modification thereof.

In addition to the high voltage terminal 4 those other portions of the apparatus which also face the grounded tank 5 may also be covered with dielectric layers in a similar manner in accordance with the invention. For example, the series of hoops 7 which form the outer boundary of the column 8 upon which the high voltage terminal 4 is supported may have their surfaces covered with dielectric layers 9. Moreover, the inner surface of the tank 5 may be covered with a dielectric layer 10 at the cylindrical part and round end thereof, as shown in FIG. 1B. Within the column 8 the total voltage is subdivided over the entire length of the column 8. Because this length is appreciably greater than the distance between the high voltage terminal 4 and the tank 5 across the insulating gas, the electric field within the column 8 will usually be sufficiently low so that the dielectric shells may not be necessary on metal surfaces within the column 8. In order to limit the maximum voltage to which the dielectric-covered gaps are subjected, a system of series spark gaps 21 between the metal electrodes 22 upon which the hoops 7 are supported may be used in accordance with the invention, as shown in FIG. 1C. In FIG. 1D, the high voltage terminal 4' has an extending lip 9 along its lower edge which is rounded at substantially the same radius as the cross-sectional radius of a hoop 7. Similarly, the dielectric shell 6' would extend over the extending lip 9 and would serve to reduce the high electrical field intensity that would otherwise exist at the transition between the high voltage terminal 4' and the first hoop 7.

Figure 1E:
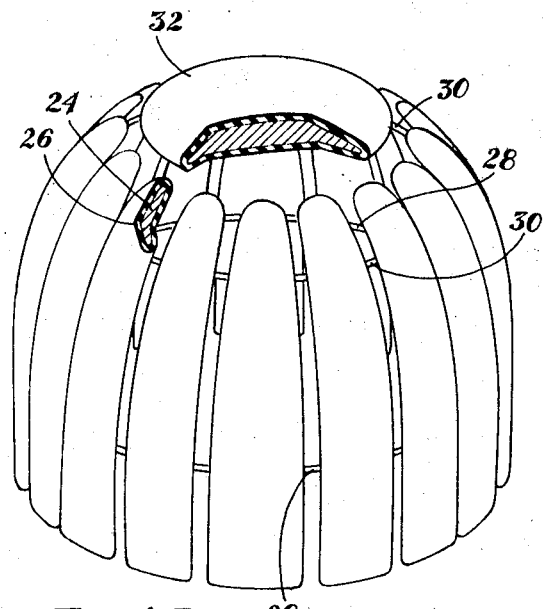
FIGS. 1E and 1F are modifications of the high voltage terminal used on the apparatus of FIGS. 1 and 1A.

In FIG. 1E, a modification of a high voltage terminal is illustrated wherein the terminal is substantially formed from a plurality of petal-like conductive elements 24. Each of the petal-like elements is coated with a dielectric coating 26 before connection to the supporting rings 28 and 30 to form the desired terminal configuration. A cap 32 is used to complete the enclosure and is also coated with the dielectric coating 26. The advantage of this form of termination is that it is made up from a number of standard modular units which are conductive to quick and economical manufacture. The supporting rings 28 and 30 may either be electrically connected to the petal-like conductive elements 24 or may contain high impedance elements such as an inductance or high resistance elements which will essentially isolate one conductive element from another during transient conditions. Thus any disturbance to one conductive element would not damage any other conductive element and greater integrity for the electrostatic generator is provided.

Figure 1F:
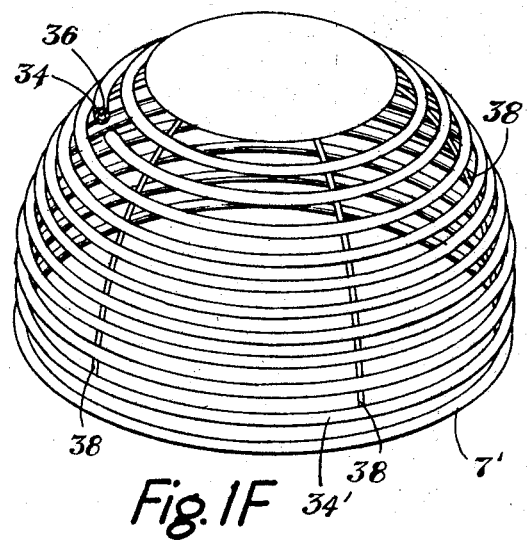
Figure 1D:
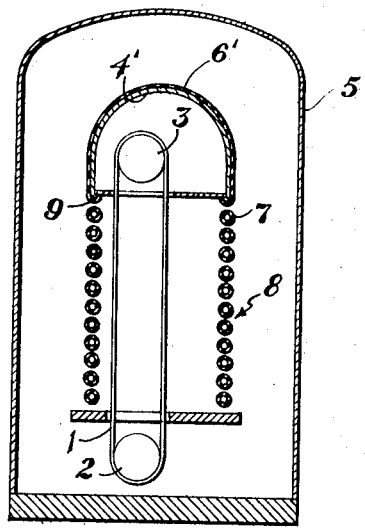
FIG. 1D is a detail similar to that of FIG. 1A and showing a modification thereof.

Another embodiment of a high voltage terminal is shown in FIG. 1F and is comprised of a plurality of decreasing diameter concentric hoops 34 covered with a dielectric coating 36. The configuration is achieved by attaching the hoops 34 to ribs 38 and at the same time providing an electrical connection between hoops 34 and ribs 38 to assure the entire terminal being at the same high potential. Rings are used such that the field will be essential uniform throughout the high voltage terminal and more important that a field distribution be assured between the first high voltage ring 34' and the last hoop 7' of the support column which is no less disturbing than the field between any two of the rings 36 of the high voltage terminal.

Figure 2:
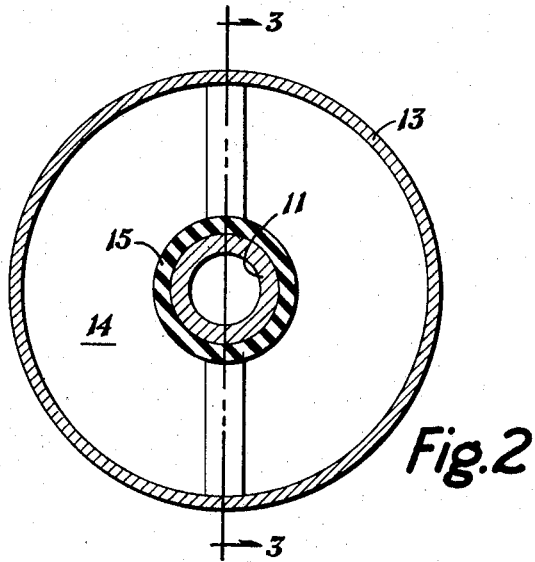
FIG. 2 is a transverse sectional view of a compressed gas-insulated transmission line constructed in accordance with the invention.
Figure 3:
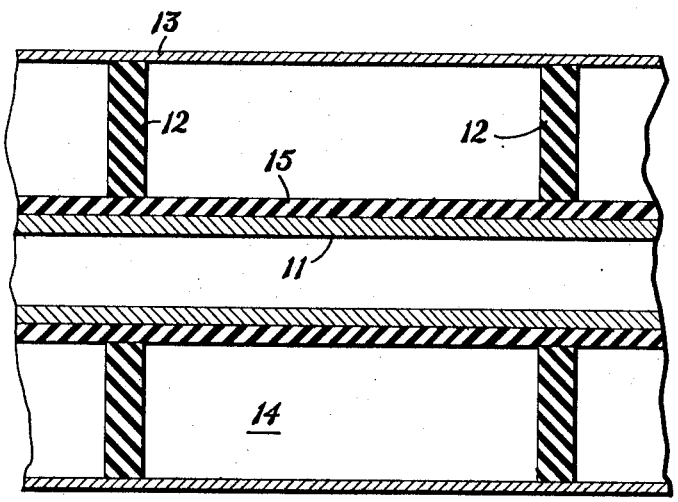
FIG. 3 is a longitudinal sectional view along the line 3—3 of FIG. 2.
Figure 4:
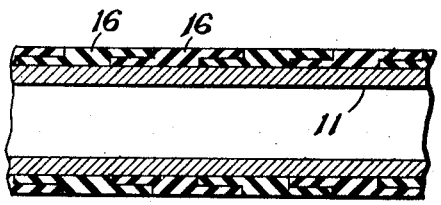
FIG. 4 is a view similar to that of FIG. 3 and showing an alternate embodiment of the invention.
Figure 5:
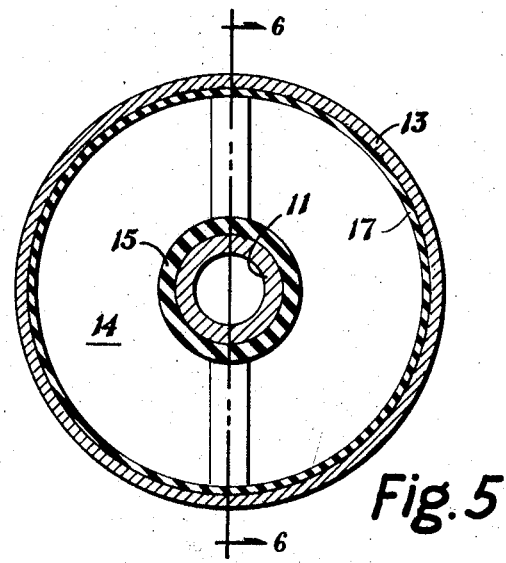
FIG. 5 is a view similar to that of FIG. 2 and showing a modification thereof.
Figure 6:
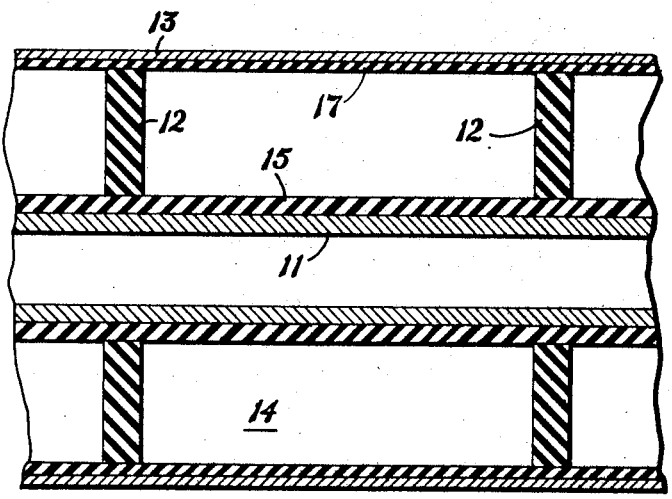
FIG. 6 is a longitudinal sectional view along the line 6—6 of FIG. 5.

Referring to FIGS. 2–4 of the drawing, the transmission line therein shown includes an inner high voltage electrode 11 designed for adequate electrical conductivity (and hence for the transmission of adequate power) and adequate stiffness (and hence having adequate mechanical strength) between spaced supports 12. By means of the space supports 12, the inner electrode 11 is supported upon and spaced from a metal pressure cylinder and grounded return conductor 13, and the space 14 therebetween is filled with a compressed gas. A dielectric cylinder 15 is mounted upon the inner electrode 11. This dielectric cylinder is either everywhere in intimate contact with the inner electrode surface, or the inner surface of the cylinder 15 is itself rendered conducting and periodically connected to the inner conductor. Ideally the dielectric cylinder 15 would have the same coefficient of expansion as the inner electrode 11 such that expansion of the inner electrode11 would not cause cracking of the dielectric cylinder 15. The dielectric of the dielectric cylinder 15 may be articulated as shown in FIG. 4 to allow for expansion of the inner conductor 11 while still maintaining a complete dielectric covering throughout. As such, any direct current flow between metallic electrodes is prevented by overlapping of adjacent dielectric elements 16. Moreover, the inner surface of the outer electrode 13 may be covered with a dielectric layer 17, as shown in FIGS. 5 and 6.

Figure 4A:
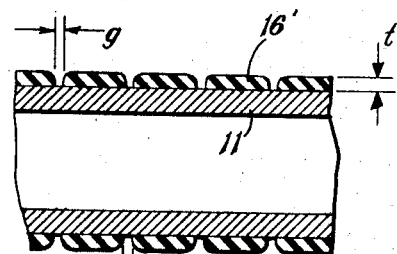
FIG. 4A is an alternate embodiment of the dielectric covering on the inner electrode.

In FIG. 4A, the inner electrode 11 has a series of surrounding dielectric rings 16' separated by gaps g which generally should be at least less than the thickness t of the dielectric ring 16'. Since field lines prefer to enter at a region and the electrode 11 would essentially act as a completely dielectric covered electrode. The number of rings and gaps per unit length of electrode would be a function of the material of the electrode 11, the dielectric material for the rings 16' and the intended power load to be carried such that longitudinal expansion of the electrode 11 would not cause deterioration of the dielectric rings 16'.

It is recommended that the solid dielectric have an impulse voltage strength sufficient to withstand at least a large fraction of the line voltage and preferably the full line voltage. Since the dielectric should be of very superior insulating material, the required thickness is still small in comparison to the length of the gaseous gap. For example, if the peak line voltage is $10^6$ volts, a thickness of 0.125 inch of certain solid epoxy dielectrics or 0.25 inch of certain laminated plastic dielectrics or 0.25 inch of certain ceramic or glass dielectrics would be sufficient to withstand all or a large part of this peak voltage over small areas and for short times. This is sufficient to permit the gas gap to recover from a localized transient instability and to resume the major portion of the insulation stress. Yet even 0.25 inch would be only a small fraction of the gas gap which might be expected to be about 5 inches more or less for this voltage.

A thinner dielectric film would function in a similar manner to the recommended thin film but would be more easily overwhelmed by a transient disturbance which could be suppressed by the thicker dielectric.

The recommended resistivity of the dielectric coating should be high but should be well below the effective resistivity of a quiescent insulating gas. Thus the solid dielectric resistivity may result in a time constant for its charging and discharging, large in comparison with the periodicity of a 60-cycle-per-second power system. The principle to be followed is that the resistivity of the solid dielectric shall be just low enough to permit it to leak away any currents which succeed in crossing the gaseous gap, and high enough that no appreciable power loss occurs in the solid dielectric due to the low frequency voltage variation. It is intended, in other words, that under normal steady conditions, only a very small fraction of the total voltage exist at very low gradient across the solid dielectric, nearly all the voltage existing across the gaseous gap.

Both for A-C and D-C systems, it would appear that the suitable range of time constants for the solid dielectric would be broadly from 0.1 second to 100 seconds or longer. In general the time constant of a resistive dielectric may be represented by $$T = k\epsilon\rho$$

where $k$ is its dielectric constant, $\epsilon$ is the permittivity of free space in farads per meter and $\rho$ is its resistivity in ohm-meters. T represents the electrical decay constant of the material in seconds. For values broadly in the range from 0.1 to 100 seconds and since $k$ is likely to have values of approximately 4, the resistivity is seen to be in the range $10^{11}$ to $10^{14}$ ohm cm.

The solid dielectric achieves the following effects which substantially increase the insulating reliability of the system.

(1) Applied to the electrode of smallest radius of curvature and correspondingly highest electric stress, it
  (A) Replaces a highly conductive surface with a material whose resistivity is more than $10^{16}$ times greater. This effectively damps out the ability of the conductive substrate to supply or accept electric charge from transient disturbances in the gaseous insulating region.
  (B) By virtue of its higher dielectric constant $k$ (for example 4 instead of 1) the solid dielectric reduces proportionately the electric gradient on the metallic substrate. This enormously reduces the possibility of minute surface projections on the metallic substrate adversely affecting the gap insulation.
  (C) The solid dielectric surface is now the electrode surface on the electrode of smallest radius of curvature. If charge from the gaseous gap is deposited thereon, it will produce locally across the solid dielectric thickness a voltage which will tend to suppress the arrival of still further charge. In the limit, for a short time, the solid dielectric could hold back most or all of the line voltage. Actually, the solid dielectric is intended to suppress such transients and hold them to levels far beneath this magnitude.
  (D) The solid dielectric surface, even if it has projections and roughness, cannot readily supply charge to the gas gap. Because of its high resistivity it impedes the flow of electric charge.
  (E) Solid dielectric surfaces can be smoother than metallic surfaces because they are solidified from the liquid state or produced between polished dies.
  (F) A solid dielectric coating reduces the ability of a free foreign conducting particle either from causing corona by becoming lodged on the conductor, or from becoming itself charged on contact with the conductor and thus electrostatically forced to traverse repeatedly the interelectrode gap.

(2) Applied to the electrode of the large radius of curvature, the shell of the transmission line, it would work in about the same way.

In the presence of an ionizing radiation field, compressed gas insulation will become ionized and a leakage current will pass between the electrodes to be insulated, with consequent accumulation of electric charge on the surface of the solid dielectric covering the electrode. This charge will accumulate until the leakage current through the dielectric is sufficient to balance the arriving ions or electrons or other charged particles. For this reason the resistivity of the electrode-covering dielectric should be sufficiently low so that the gradient which develops across the dielectric may not cause volume breakdown.

A calculation can be made to produce a quantitative number for the maximum desirable resistivity in the presence of a fairly intense X-ray (or other ionizing) radiation such as may be present in proximity to any large particle accelerator. Such a calculation has shown that the maximum desirable resistivity of the dielectric coating on a compressed gas insulated system is $6 \times 10^{13}$ ohm cm.

This calculation assumes a field intensity of 1 roentgen (r.) per hour which is considerable but by no means the maximum X-ray level encountered in particle accelerator practice. In general, however, the level is less than 1 r. per hour. This calculation is also based on the concentric cylindrical geometry of a fairly small belt-type electrostatic generator having a 20″ terminal diameter and a 42″ tank diameter. Larger machines should be reduced proportionately to avoid extensive gradients through the volume of the dielectric. It is also assumed that the dielectric should not be stressed more than 5 kilovolts per cm. by the accumulation of charge on its surface. Most dielectrics will hold more than 10 times this gradient and some will hold 100 times. In addition, it is assumed that the dielectric is ½″ thick though the assumed thickness does not effect the result provided it is negligible in comparison to the gas gap.

For the above assumptions, this analysis shows that the maximum desirable resistivity of the dielectric coating on a compressed-gas-insulated system is $6 \times 10^{13}$ ohm cm.

The above suggests that, in the presence of a penetrating radiation traversing a compressed gas insulated system, any dielectric covering an electrode should have a resistivity sufficiently low to permit the flow through it of the electric charge separated by the ionizing radiation without requiring an excessive potential across the dielectric thickness. Yet even in the presence of a fairly intense ionizing radiation field the dielectric resistivity can be high enough to accomplish the improvement disclosed and claimed herein.

Having thus described the principles of the invention together with several illustrative embodiments thereof, it is to be understood that although specific terms are employed they are used in a generic and descriptive sense and not for purposes of limitation, the scope of the invention being set forth in the following claims.

I claim:

1. A high voltage-high current electric power transmission system comprising:
at least one hollow conductive electrode at high voltage relative to ground,
a gas tight shell at substantially ground potential surrounding said conductive electrode,
a continuous solid dielectric for covering all of the exterior surface of said conductive electrode, said solid dielectric interposed between said conductive electrode and said gas-tight shell to provide a void free dielectric covered electrode between said continuous solid dielectric and hollow conductor,
means for supporting said continuous dielectric covered electrode within said gas-tight shell, a gaseous electrical insulating medium filling the remaining space between said dielectric covered electrode and said gas-tight shell.

2. A high voltage-high current electric power transmission system comprising:
at least one hollow conductive electrode relative to ground,
a gas-tight shell at substantially ground potential surrounding said conductive electrode,
a solid dielectric for covering all of the exterior surface of said conductive electrode, said solid dielectric interposed between said conductive electrode and said gas-tight shell to provide a dielectric covered electrode and wherein the interior surface of said solid dielectric covering said conductive electrode is rendered conducting and is periodically connected to said conductive electrode,
means for supporting said dielectric covered electrode within said gas-tight shell,
a gaseous electrical insulating medium filling the remaining space between said dielectric covered electrode and said gas-tight shell.

3. An electric power transmission system as set forth in claim 1 wherein the thickness of said solid dielectric is small between dielectric covered electrode and said gas-tight shell.

4. An electric power transmission system as set forth in claim 1 wherein the solid dielectric is articulated and disposed with respect to said conductive electrode that the electric field at the electrode surface remains reduced.

5. An electric power transmission system as set forth in claim 1 wherein said system also includes a solid dielectric intimately bonded to and covering all of the interior surface of said gas-tight shell.

6. An electric power transmission system as set forth in claim 1 wherein said solid dielectric has a smooth surface and is free from projecting points and edges.

7. An electric power transmission system as set forth in claim 1 wherein said solid dielectric is able to conduct heat and to withstand high temperatures.

8. A system for the transmission of electric power at high voltage as set forth in claim 1 wherein said supporting means are separate from and exterior to said solid dielectric.

9. A system for the transmission of electric power at high voltage as set forth in claim 1 wherein said solid dielectric is an insulating oxide of a metal.

10. An electric power transmission system comprising:
a gas tight shell at substantially ground potential surrounding said conductive shell electrode,
a plurality of dielectric cylinders attached to and surrounding said conductive electrode, said dielectric cylinders spaced apart at a distance no greater than the thickness of said dielectric cylinders,
means for supporting said conductive electrode within said gas-tight shell,
a gaseous insulating medium filling the remaining space between said conductive electrode and said gas-tight shell.

11. A system for the generation and storage of high voltage comprising:
at least one conductive electrode at high voltage relative to ground,
a gas-tight shell at ground potential surrounding said conductive electrode,
a solid dielectric for covering all of the exterior surface of said conductive electrode subject to high electric fields so as to intercept at all points the electric field between the conductive electrode and the gas-tight shell,
columnar support means for supporting said conductive electrode within said gas-tight shell, said columnar support means connected on one end to said conductive electrode and subdividing the voltage difference between said conductive electrode and said gas-tight shell,
a gaseous electrical insulating medium filling the remaining space between said conductive electrode and said gas-tight shell,
said solid dielectric having a column resistivity lower than that of said gaseous medium for increasing the electric field strength of the system under normal and transient voltage conditions by reducing the ability of the conductive electrode to supply field distorting space charge into the gaseous medium.

12. A system for the generation and storage of high voltage as set forth in claim 11 wherein the resistivity of the solid dielectric is less than that of the gaseous insulating medium by at least one order of magnitude even when said gas in subjected to ionizing radiation.

13. A system for the generation and storage of high voltage as set forth in claim 11 wherein said conductive electrode is comprised of a plurality of petal-like members mounted externally to at least one support ring, said support ring electrically connected to all of said petal-like members.

14. A system for the generation and storage of high voltage as set forth in claim 11 wherein said conductive electrode is comprised of a plurality of petal-like members mounted externally to and electrically isolated from at least one support ring, each of said petal-like members having a respective high voltage connection, said petal-like members being electrically isolated from one another during transient conditions on any one of them by high impedance means.

15. A system for the generation and storage of high voltage as set forth in claim 11 wherein said conductive electrode is comprised of a plurality of concentric rings of decreasing diameter, said concentric rings mounted progressively on at least one arched support at a predetermined spacing to provide a substantially enclosed configuration, said arched support electrically connecting all of said concentric rings.

References Cited

UNITED STATES PATENTS

| 2,501,881 | 3/1950 | Trump | 310—5 |
| 3,345,450 | 10/1967 | Spindle | 174—28 |

FOREIGN PATENTS

| 1,068,970 | 5/1967 | Great Britain. |

DAVID X. SLINEY, Primary Examiner

U.S. Cl. X.R.

174—28, 127

UNITED STATES PATENT OFFICE
CERTIFICATE OF CORRECTION

Patent No. 3,515,909         Dated June 2, 1970

Inventor(s) J. G. Trump

It is certified that error appears in the above-identified patent and that said Letters Patent are hereby corrected as shown below:

Column 4, line 75 delete "and" and insert therefor --of higher dielectric constant--

Signed and sealed this 25th day of April 1972.

(SEAL)
Attest:

EDWARD M. FLETCHER, JR.          ROBERT GOTTSCHALK
Attesting Officer                Commissioner of Patents